(12) United States Patent
Matsubara et al.

(10) Patent No.: US 8,380,409 B2
(45) Date of Patent: Feb. 19, 2013

(54) VEHICLE POWER TRANSMISSION SYSTEM

(75) Inventors: Tooru Matsubara, Toyota (JP); Kenta Kumazaki, Toyota (JP); Atsushi Tabata, Okazaki (JP); Masakazu Kaifuku, Okazaki (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 780 days.

(21) Appl. No.: 12/232,980

(22) Filed: Sep. 26, 2008

(65) Prior Publication Data
US 2009/0088937 A1 Apr. 2, 2009

(30) Foreign Application Priority Data

Sep. 28, 2007 (JP) ................................. 2007-254061

(51) Int. Cl.
*G06G 7/70* (2006.01)
(52) U.S. Cl. ............... 701/67; 701/51; 701/54; 701/90; 701/95
(58) Field of Classification Search .............. 701/54, 701/51, 67, 90, 95
See application file for complete search history.

(56) References Cited

U.S. PATENT DOCUMENTS

| | | | |
|---|---|---|---|
| 6,459,980 B1 * | 10/2002 | Tabata et al. | 701/70 |
| 6,832,148 B1 * | 12/2004 | Bennett et al. | 701/54 |
| 6,913,558 B2 * | 7/2005 | Mori et al. | 477/3 |
| 2005/0247495 A1 * | 11/2005 | Tabata et al. | 180/65.2 |
| 2008/0083292 A1 * | 4/2008 | Muta et al. | 74/336 R |
| 2008/0120000 A1 * | 5/2008 | Heap et al. | 701/54 |
| 2008/0173485 A1 * | 7/2008 | Kumazaki et al. | 180/65.2 |
| 2008/0176708 A1 * | 7/2008 | Tamai et al. | 477/125 |

FOREIGN PATENT DOCUMENTS

| | | |
|---|---|---|
| JP | A-09-327104 | 12/1997 |
| JP | A 2001-030776 | 2/2001 |
| JP | B2-3346375 | 9/2002 |
| JP | A-2005-319924 | 11/2005 |
| JP | A-2006-046386 | 2/2006 |

OTHER PUBLICATIONS

Apr. 11, 2012 Office Action issued in JP Application No. 2007-254061 (with English translation).
Office Action issued Jul. 17, 2012 in Japanese Patent Application No. JP 2007-254061 with English translation.

* cited by examiner

*Primary Examiner* — James Trammell
*Assistant Examiner* — Truc M Do
(74) *Attorney, Agent, or Firm* — Oliff & Berridge, PLC

(57) ABSTRACT

A vehicle power transmission system has a first electric motor, a differential section, a power interruption element forming part of a power transmission path, a second electric motor connected to a power transmission path, and a control device that maintains the output rotational speed of the differential section at a predetermined constant value or at a value within a predetermined range until the engagement of the power interruption element is completed, so as to control a rotational speed of a primary power source by the first electric motor during the period when the state of the vehicle power transmission system is being switched front a non-drive mode to a drive mode.

13 Claims, 10 Drawing Sheets

FIG. 2

|     | C1 | C2 | B1 | B2 | B3 | SPEED RATIO | STEP |
|-----|----|----|----|----|----|-------------|------|
| 1st | ○  |    |    |    | ○  | 3.357       | 1.54 |
| 2nd | ○  |    |    | ○  |    | 2.180       | 1.53 |
| 3rd | ○  |    | ○  |    |    | 1.424       | 1.42 |
| 4th | ○  | ○  |    |    |    | 1.000       | TOTAL 3.36 |
| R   |    | ○  |    |    | ○  | 3.209       |      |
| N   |    |    |    |    |    |             |      |

– 1 –

VEHICLE POWER TRANSMISSION SYSTEM

INCORPORATION BY REFERENCE

The disclosure of Japanese Patent Engagement No. 2007-254061 filed on Sep. 28, 2007 including the specification, drawings and abstract is incorporated herein by reference in its entirety.

BACKGROUND OF THE INVENTION

1. Field of the Invention

The invention relates to a vehicle power transmission system that suppresses deterioration of the drivability of the vehicle when the vehicle power transmission system is switched from a non-drive mode to a drive mode.

2. Description of the Related Art

A control device of vehicle power transmission system is known, which has a first electric motor, a differential section that is provided with a rotational element connected to the first electric motor to control a differential motion between an input rotation to the differential section and an output rotational speed of the differential section by controlling the operation state of the first electric motor, a power interruption element that forms a part of a power transmission path, a second electric motor that is connected to the power transmission path between the power interruption element and the output rotational element of the differential section. For example, according to a control device of a hybrid vehicle in Japanese Patent No. 3346375, a control is performed such that power transmission from a power source is interrupted during the period when the power transmission system is switched from a non-drive mode to a drive mode. Thus, switching toward the drive mode may be smoothly performed while shift shocks is effectively suppressed, regardless of variations of the output state in the power source due to variations of the accelerator depression amount or switching of the operation mode.

With regard to power transmission system having a differential section as described above, the inventors have found that the output rotational speed of the differential section needs to be maintained constant, preferably, fixed at zero when the engine is being started up or when a load operation is performed for power charging via an electric motor while the engine is being operated at a non-drive range (e.g., P range and N range). However, according to related arts as described above, when the shift range is changed from a non-drive range (e.g., P range and N range) to a drive range (e.g., D range and R range), it may result in an increase in the output rotational speed of the differential section, causing engagement shocks, abnormal engine noise, and so on because the constant output rotational speed of the differential section is not maintained any longer so as to establish the drive state of the power transmission system before the engagement of the coupling element is completed.

SUMMARY OF THE INVENTION

The invention provides a vehicle power transmission system that suppresses deterioration of the drivability of the vehicle when the vehicle power transmission system is switched from a non-drive mode to a drive mode.

One aspect of the invention relates to a vehicle power transmission system, which includes: a first electric motor, a differential section that is provided with a rotational element connected to the first electric motor to control a differential motion between an input rotational speed and an output rotational speed by controlling the operation state of the first electric motor, a power interruption element that forms a part of a power transmission path, a second electric motor that is connected to the power transmission path between the power interruption element and the output rotational element of the differential section; and a control device that continues to maintain the output rotation speed from the differential section at a predetermined constant value or at a value within a predetermined range during the period when the state of the vehicle power transmission system is being switched from a non-drive mode to a drive mode, so as to control the rotational speed of a primary power source by means of the first electric motor until the engagement of the power interruption element is completed.

According to the vehicle power transmission system described above, the output rotational speed of the differential section is prevented from fluctuating until the vehicle power transmission system is placed in the drive state, and therefore engagement shocks, abnormal engine noise, and so on, may be effectively suppressed.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein:

FIG. 2 is an engagement table indicating the engagement states of hydraulic friction engagement elements that are selectively engaged to establish each speed at an automatic transmission section of the vehicle power transmission system shown in FIG. 1;

DETAILED DESCRIPTION OF EMBODIMENTS

Hereinafter, example embodiments of the invention will be described in detail with reference to the accompanying drawings.

Figure 1:
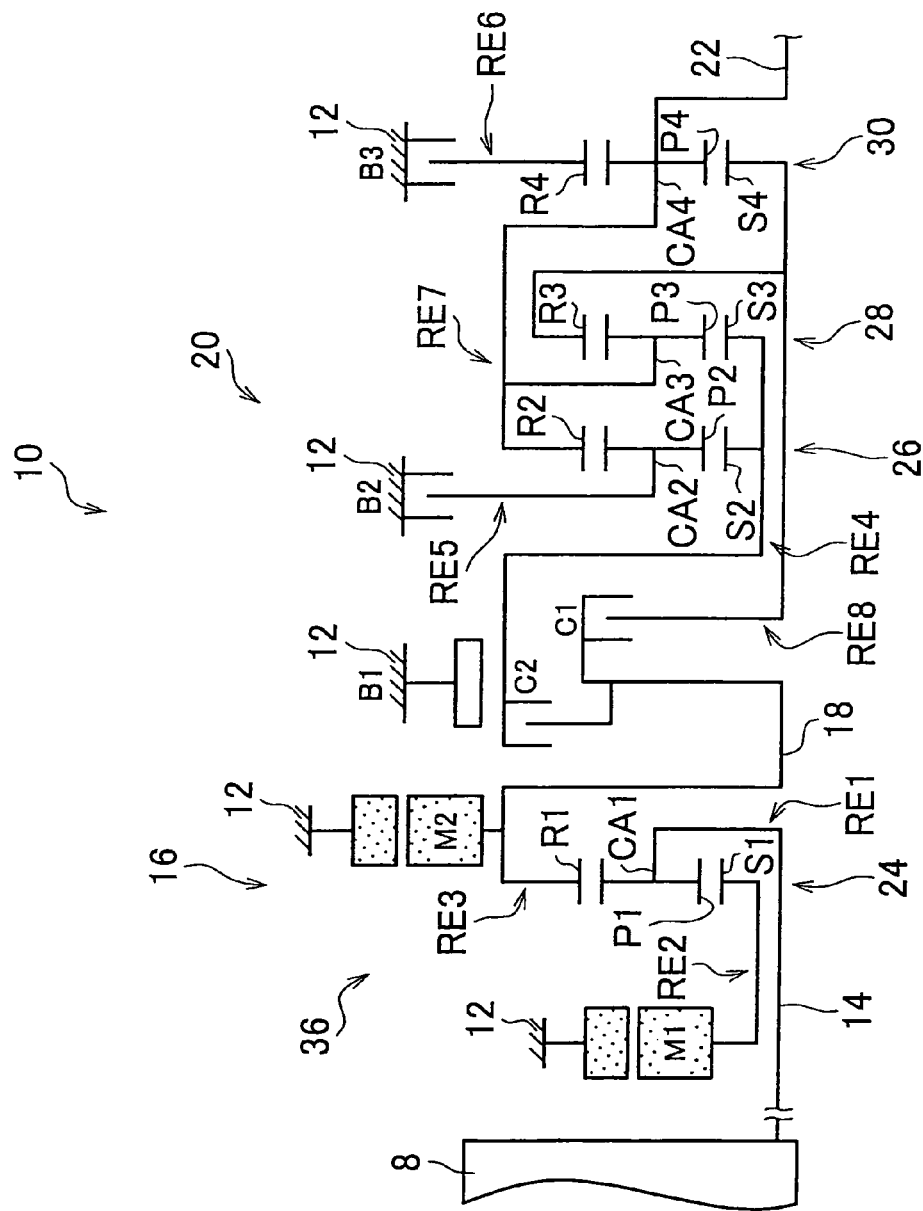
FIG. 1 is a view schematically illustrating the configuration of a vehicle power transmission system according to an example embodiment of the invention.

FIG. 1 is a view illustrating the configuration of a vehicle power transmission system 10 according to the invention. For example, the vehicle power transmission system 10 is longitudinally arranged in an FR (Front-engine Rear-drive) vehicle. The vehicle power transmission system 10 includes an input shaft 14, a differential section 16 connected directly to the input shaft 14 or indirectly to the input shaft 14 via a pulsation-absorbing damper (i.e., vibration damping device, not shown in the drawings), an automatic transmission section 20 connected in series via a transmission member (transmission shaft) 18 on a power transmission path between the differential section 16 and drive wheels 34 (shown in FIG. 6), an output shaft 22 connected to the automatic transmission section 20. These components are coaxially arranged in series in a transmission case 12 serving as a non-rotating element, which is attached to the vehicle body. The drive force (rotational torque) output from the differential section 16 is transferred to the automatic transmission section 20 via the transmission member 18. That is, the transmission member 18 serves as an output rotational element of the differential section 16.

The vehicle power transmission system 10 has an engine 8 that serves as a primary power source for moving the vehicle. The output shaft (crankshaft) of the engine 8 is connected directly to the input shaft 14 or indirectly to the input shaft 14 via a pulsation-absorbing damper, not shown in the drawings. The engine 8 is, for example, an internal combustion engine (e.g., gasoline engine, diesel engine) that produces drive force by combusting fuel in engine cylinders. A differential gear unit (final gear unit) 32 (shown in FIG. 6), which forms part of the power transmission path, is provided between the engine 8 and the pair of the drive wheels 34 (shown in FIG. 6). The drive force output from the engine 8 is transferred to the drive wheels 34 via the differential section 16, the automatic transmission section 20, the differential gear unit 32, and a pair of axles, in sequence. In the vehicle power transmission system 10 of the example embodiment, the engine 8 and the differential section 16 are directly connected to each other. The phrase "directly connected" means that the engine 8 and the differential section 16 are connected not through fluid-type transmission devices, such as torque converters and fluid couplings. On the other hand, for example, if the engine 8 and the differential section 16 are connected through a pulsation-absorbing damper, it may be regarded as "direct connection". Meanwhile, it is to be noted that the vehicle power transmission system 10 is symmetrical about its axis and the lower side of the vehicle power transmission system 10 is omitted in FIG. 1.

The differential section 16 has a first electric motor M1, a second electric motor M2, and a first planetary gearset 24 of a single pinion type. The differential section 16 is structured such that the differential motion between the input rotation speed and the output rotation speed is controlled in accordance with the control of the operation state of the first electric motor M1. The first electric motor M1 is connected to a sun gear S1 (a second rotational element RE2) serving as a rotating element of the first planetary gearset 24, and the second electric motor M2 is connected to a ring gear R1 (a third rotational element RE3) of the first planetary gearset 24, which rotates together with the transmission member 18. In other words, the differential section 16 has a mechanical structure that mechanically distributes the output of the first electric motor M1 and the output of the engine 8 that is input from the input shaft 14. The differential section 16 thus constitutes a power distribution mechanism 36 serving as a differential mechanism to distribute the engine output to the first electric motor M1 and the transmission member 18. The first electric motor M1 and the second electric motor M2 are preferably a motor generator that serves as both a motor that produces mechanical drive force from electric power and a generator that produces electric power from the mechanical drive force. The first electric motor M1 functions at least as a generator for producing reactive force, and the second electric motor M2 functions at least as a motor for outputting drive force as another power source for moving the vehicle. That is, in the vehicle power transmission system 10, the second electric motor M2 serves as another power source (i.e., a secondary power source) that produces drive force as an alternative to the engine 8 or together with the engine 8.

The first planetary gearset 24 has a predetermined gear ratio $\rho 1$ of 0.418, for example. The first planetary gearset 24 is the main component of the power distribution mechanism 36. The first planetary gearset 24 has a plurality of rotational elements, which are the sun gear S1, first pinions P1, a first carrier CA1 on which the first pinions P1 are supported so as to rotate on its axis while revolving around the sun gear S1, and a first ring gear R1 meshing with the first sun gear S1 via the first pinions P1. Assuming that the number of teeth of the first sun gear S1 is ZS1 and the number of teeth of the first ring gear R1 is ZR1, the gear ratio $\rho 1$ of the first planetary gearset 24 is represented as ZS1/ZR1.

In the power distribution mechanism 36, the first carrier CA1 is coupled with the input shaft 14, that is, it is connected to the engine 8. The first sun gear S1 is connected to the first electric motor M1. The first ring gear R1 is coupled with the transmission member 18. Configured as described above, the power distribution mechanism 36 has a differential function enabling the three rotational elements of the first planetary gearset 24, that is, the first sun gear S1, the first carrier CA1, and the first ring gear R1 to rotate relative to each other. Thus, through the differential motion at the differential mechanism 36, the drive force output from the engine 8 is distributed to the first electric motor M1 and the transmission member 18. Furthermore, using a portion of the distributed drive force enables the first electric motor M1 to generate electric power or the second electric motor M2 to be driven. As such, the differential section 16 (the power distribution mechanism 36) functions as an electric differential mechanism. Thus, the differential section 16 operates a so-called continuously variable transmission (electric CVT) that continuously changes the rotational speed of the transmission member 18, regardless of the rotation of the engine 8. That is, the differential section 16 is an electric differential section that functions as an electric CVT having a transmission gear ratio $\gamma 0$ (i.e., the rotational speed $N_{IN}$ of the input shaft 14/the rotational speed $N_{18}$ of the transmission member 18) that continuously varies between a minimum value $\gamma 0_{min}$ and a maximum value $\gamma 0_{max}$.

The automatic transmission section 20 is a planetary-gear-based multi-speed transmission that operates as a non-continuous multi-speed automatic transmission, and has a second planetary gearset 26 of a single-pinion type, a third planetary gearset 28 of a single pinion-type and a fourth planetary gearset 30 of a single pinion type. The second planetary gearset 26 has a second sun gear S2, second planetary pinions P2, a second carrier CA2 on which the second pinions P2 are supported so as to rotate on its axis while revolving around the second sun gear S2, and a second ring gear R2 meshing with the second sun gear S2 via the second pinions P2. The second planetary gearset 26 has the gear ratio ρ2 of 0.562, for example. The third planetary gearset 28 has a third sun gear S3, third planetary pinions P3, a third carrier CA3 on which the third pinions P3 are supported so as to rotate on its axis while revolving around the third sun gear S3, and a third ring gear R3 meshing with the third sun gear S3 via the third pinions P3. The third planetary gearset 28 has the gear ratio ρ3 of 0.425, for example. The fourth planetary gearset 30 has a fourth sun gear S4, fourth planetary pinions P4, a fourth carrier CA4 on which the fourth pinions P4 are supported so as to rotate on its axis while revolving around the fourth sun gear S4, and a fourth ring gear R4 meshing with the fourth sun gear S4 via the fourth pinions P4. The fourth planetary gearset 30 has the gear ratio ρ4 of 0.421, for example. Assuming that the number of teeth of the second sun gear S2 is ZS2 and the number of teeth of the second ring gear R2 is ZR2, the gear ratio ρ2 of the second planetary gearset 26 is represented as ZS2/ZR2. Assuming that the number of teeth of the third sun gear S3 is ZS3 and the number of teeth of the third ring gear R3 is $ZR^3$, the gear ratio ρ3 of the third planetary gearset 28 is represented as ZS3/ZR3. Assuming that the number of teeth of the fourth sun gear S4 is ZS4 and the number of teeth of the fourth ring gear R4 is ZR4, the gear ratio ρ4 of the fourth planetary gearset 30 is represented as ZS4/ZR4.

The automatic transmission section 20 has a first clutch C1, a second clutch C2, a first brake B1, a second brake B2, and a third brake B3, which are a plurality of engagement elements for establishing a desired shift range in the automatic transmission section 20. Note that the clutches C1 to C3 and the brakes B1 and B2 may be collectively referred to as "clutches C" and "brakes B", respectively unless a specific identification is needed. The clutches C and the brakes B are hydraulic friction engagement elements which are typically used for vehicle automatic transmissions in related arts. The clutches C and the brakes B include wet multi-disc engagement elements and band brakes. The wet multi-disc engagement elements are constituted of a plurality of friction discs alternately arranged and pressed against each other by a hydraulic actuator. In the band brakes, one or two bands are wound around the drum, and one end of the bands is pulled by a hydraulic actuator. The clutches C and the brakes B are each interposed between two parts or components and selectively engaged to couple them together.

In the automatic transmission section 20 configured as described above, the second sun gear S2 and the third sun gear S3 are coupled with each other and selectively coupled with the transmission member 18 via the second clutch C2 and with the case 12 via the first brake B1. The second carrier CA2 is selectively coupled with the case 12 via the second brake B2. The fourth ring gear R4 is selectively coupled with the case 12 via the third brake B3. The second ring gear R2, the third carrier CA3, and the fourth carrier CA4 are coupled with each other and selectively coupled with the transmission member 18 via the first clutch C1.

As such, the automatic transmission section 20 and the differential section 16 (the transmission member 18) are selectively coupled with each other via the first clutch C1 and/or the second clutch C2 that are used to establish each speed of the automatic transmission section 20. In other words, the first clutch C1 and the second clutch C2 serve as engagement elements for switching the state of the power transmission path between the transmission member 18 and the automatic transmission section 20, that is, the power transmission path from the differential section 16 (the transmission member 18) to the drive wheels 34, between a power transmission state in which drive force is transferred via said path and a driver-force interrupting state where the power transmission is interrupted. More specifically, when at least one of the first clutch C1 and the second clutch C2 is engaged, the power transmission path is placed in the power transmission state where and therefore the vehicle is driven to run, and when the first clutch C1 and the second clutch C2 are both released, the power transmission path is placed in the drive-force interrupting state where the vehicle is not driven. That is, among the frictional engagement elements provided in the automatic transmission section 20, at least the first clutch C1 and the second clutch C2 may be regarded as corresponding to "power interruption element" cited in the claims.

In the automatic transmission section 20, "clutch-to-clutch shift" is performed to selectively establish each gearshift range by releasing one-side engagement elements and engaging the other-side engagement elements. This enables the transmission gear ratio γ (i.e., the rotational speed $N_{IN}$ of the transmission member 18/the rotational speed $N_{OUT}$ of the output shaft 22) with respect to each gearshift range to change substantially geometrically. For example, referring to a engaged state represented by circles in the engagement table of the FIG. 2, engaging the first clutch C1 and the third brake B3 establishes the first speed having a transmission gear ratio γ1 that is, for example, approx. 3.357, and engaging the first clutch C1 and the second brake B2 establishes the second speed having a transmission gear ratio γ2 that is, for example, approx. 2.180 lower than the transmission gear ratio γ1 of the first speed, engaging the first clutch C1 and the first brake B1 establishes the third speed having a transmission gear ratio γ3 that is, for example, approx. 1.424 lower than the transmission gear ratio γ2 of the second speed, engaging the fist clutch C1 and the second clutch C2 establishes the fourth speed having a transmission gear ratio γ4 that is, for example, approx. 1.000 lower than the transmission gear ratio γ3 of the third speed, engaging the second clutch C2 and the third brake B3 establishes the reverse speed having a transmission gear ratio γR that is, for example, approx. 3.209 higher than the transmission gear ratio γ1 of the first speed but lower than the transmission gear ratio γ2 of the second speed. Also, releasing the first clutch C1, the second clutch C2, the first brake B1, the second brake B2 and the third brake B3 establishes the neutral state ("N").

In the vehicle power transmission system 10 structured as described above, the differential section 16 as a CVT and the automatic transmission section 20 as a non-continuous multi-speed transmission together constitute a CVT as a whole. On the other hand, as long as the transmission gear ratio of the differential section 16 is maintained constant, the differential section 16 and the automatic transmission section 20 constitute a non-continuous multi-speed transmission as a whole. More specifically, as the differential section 16 operates as a CVT while the automatic transmission section 20, which is provided in series with respect to the differential section 16, operates as a non-continuous multi-speed transmission, the speed of rotation input to the automatic transmission section 20, that is, the rotational speed of the transmission member 18 is continuously changed at a specific speed M of the automatic transmission section 20, and thus a continuously variable speed range may be obtained at the speed M of the automatic transmission section 20. As such, a total transmission gear ratio γT of the vehicle power transmission system 10 (i.e., the rotational speed $N_{IN}$ of the input shaft 14/the rotational speed $N_{OUT}$ of the output shaft 22) is continuously variable, and thus the vehicle power transmission system 10 can operate as a CVT. As such, the total transmission gear ratio γT is the total transmission gear ratio of the vehicle power transmission system 10 that is established based on the transmission gear ratio γ0 of the differential section 16 and the transmission gear ratio γ of the automatic transmission section 20.

For example, the rotational speed of the transmission member 18 is continuously changed at each of the first to fourth speeds and the reverse speed of the automatic transmission section 20 shown in the engagement table of FIG. 2. That is, a continuously variable speed range is obtained at each speed of the automatic transmission section 20. Thus, due to the continuously variable speed ranges at the respective speeds of the automatic transmission section 20, the total transmission gear ratio γT of the vehicle power transmission system 10 is continuously variable. As the automatic transmission section 20 is shifted among the first to fourth speeds and the reverse speed by selectively engaging the clutches C and the brakes B while maintaining the transmission gear ratio of the differential section 16 constant, the total transmission gear ratio γT of the vehicle power transmission system 10 changes in a stepwise manner substantially geometrically. In this way, the vehicle power transmission system 10 can operate also as a non-continuous multi-speed transmission. The engagement table of FIG. 2 indicates the values of the total transmission gear ratio γT of the vehicle power transmission system 10 that are obtained at the first to fourth speeds and the reverse speed of the automatic transmission section 20, respectively, when the transmission gear ratio γ0 of the differential section 16 is maintained at 1, for example. If the transmission gear ratio γ0 of the differential section 16 is maintained at a value smaller than 1, for example, approx. 0.7, the total transmission gear ratio γT of the vehicle power transmission system 10 at the fourth speed of the automatic transmission section 20 is approx. 0.7.

Figure 3:
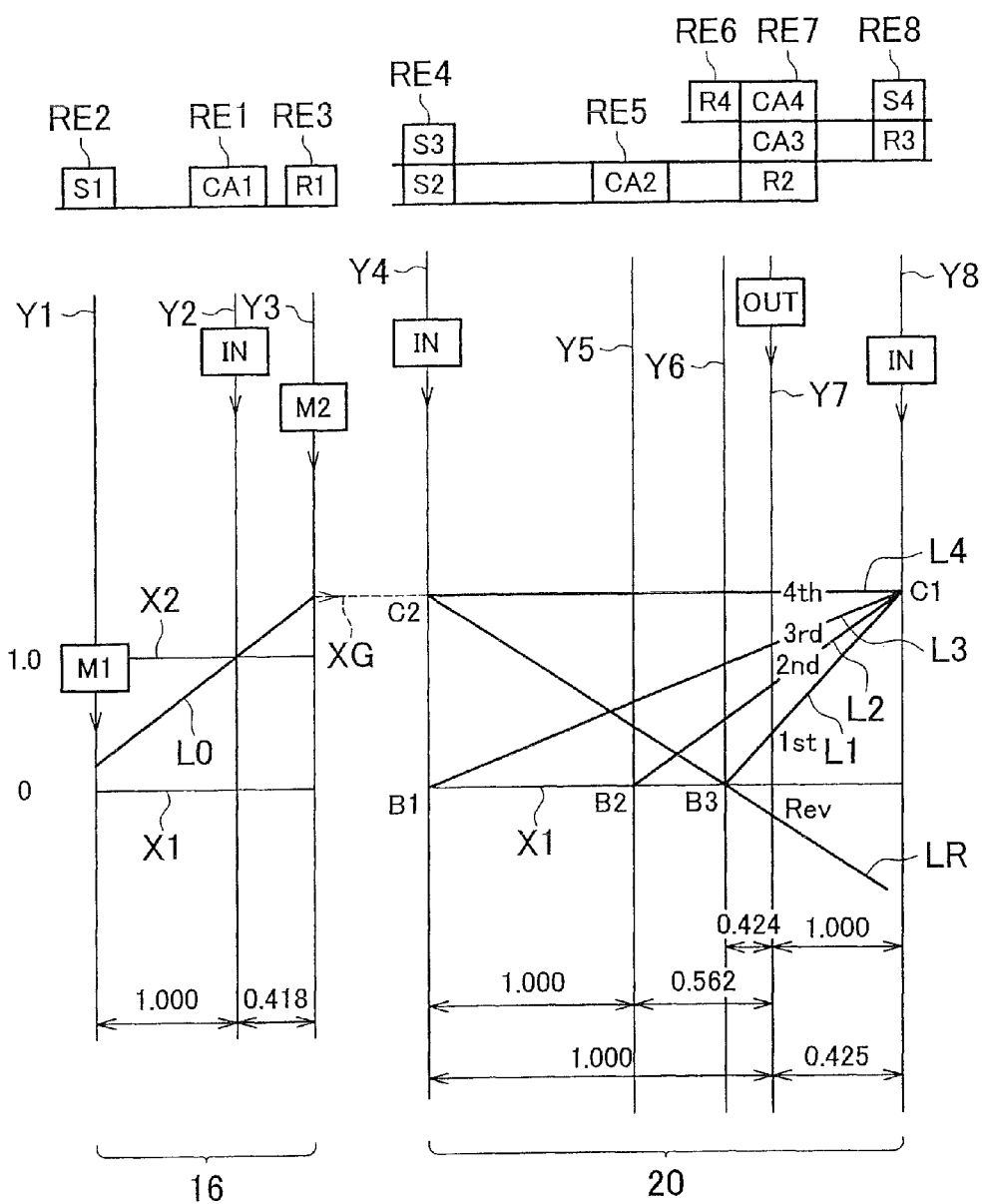
FIG. 3 is an alignment chart indicating, on straight lines, the relations between the rotational speeds of the respective rotational elements of a differential section and the automatic transmission section of the vehicle power transmission system shown in FIG. 1 at each speed.

FIG. 3 is an alignment chart indicating, on straight lines, the relations between the rotational speeds of the respective rotational elements of the vehicle power transmission system 10 that is constituted of the differential section 16 and the automatic transmission section 20 as described above. Note that the coupling state of each rotational element of the vehicle power transmission system 10 varies at each speed. The alignment chart of FIG. 3 is a two-dimensional coordinate the lateral axis of which represents the relations among the transmission gear ratios ρ of the first planetary gearset 24, the second planetary gearset 26, the third planetary gearset 28, and the fourth planetary gearset 30 and the vertical axis of which represents the relative rotational speeds. The lateral line X1 represents the rotational speed of 0, the lateral line X2 represents the rotational speed of 1.0, that is, the engine speed $N_E$ of the engine 8 connected to the input shaft 14, and the lateral line XG represents the rotational speed of the transmission member 18. The three vertical lines Y1, Y2, and Y3 correspond to the three rotational elements of the power distribution mechanism 36 constituting the differential section 16. More specifically, from the left of the chart, the vertical line Y1 represents the relative rotational speed of the first sun gear S1 that is a second rotational element (second element) RE2, the vertical line Y2 represents the relative rotational speed of the first carrier CA1 that is a first rotational element (first element) RE1, and the vertical line Y3 represents the relative rotational speed of the first ring gear R1 that is a third rotational element (third element) RE3. The intervals between the vertical lines Y1, Y2, and Y3 depend an the gear ratio ρ1 of the first planetary gearset 24. Likewise, the five vertical lines Y4, Y5, Y6, Y7, and Y8 correspond to the five rotational elements of the automatic transmission section 20. More specifically, from the left of the chart, the vertical line Y4 represents the relative rotational speed of the second sun gear S2 and the third sun gear S3 coupled with each other and corresponding together to a fourth rotational element (fourth element) RE4, the vertical line Y5 represents the relative rotational speed of the second carrier CA2 corresponding to a fifth rotational element (fifth element) REA, the vertical line Y6 represents the relative rotational speed of the fourth ring gear R4 corresponding to a sixth rotational element (sixth element) RE6, the vertical line Y7 represents the relative rotational speed of the second ring gear R2, the third carrier CA3, and the fourth carrier CA4 coupled with each other, and corresponding together to a seventh rotational element (seventh element) RE7, and the vertical line Y8 represents the relative rotational speed of the third ring gear R3 and the fourth sun gear S4 coupled with each other and corresponding together to an eighth rotational element (eighth element) RE8. The intervals between the vertical lines Y4, Y5, Y6, Y7, and Y8 depend on the gear ratio ρ2 of the second planetary gearset 26, the gear ratio ρ3 of the third planetary gearset 28, and the gear ratio ρ4 of the fourth planetary gearset 30. That is, in the differential section 16, the interval between the vertical lines Y1 and Y2 is set to a value corresponding to "1" while the interval between the vertical lines Y2 and Y3 is set to a value corresponding to the gear ratio ρ1. With regard to the second planetary gearset 26, the third planetary gearset 28, and the fourth planetary gearset 30, likewise, the interval between the sun gear and the carrier is set to a value corresponding to "1" while the interval between the carrier and the ring gear is set to a value corresponding to the gear ratio ρ.

Referring to the alignment chart of FIG. 3, in the power distribution mechanism 36 (the differential section 16), the first rotational element RE1 (the first carrier CA1) of the first planetary gearset 24 is coupled with the input shaft 14, that is, the output shaft of the engine 8, the second rotational element RE2 is connected to the first electric motor M1, and the third rotational element RE3 (the first ring gear R1) is coupled with the transmission member 18 and connected to the second electric motor M2. Thus, the rotation of the input shaft 14 is transferred (input) to the automatic transmission section 20 via the transmission member 18. In FIG. 3, a line L0 extending obliquely through the point of intersection between the lines Y2 and X2 represents the relation between the rotational speed of the first sun gear S1 and the rotational speed of the first ring gear R1. For example, in a state where the first rotational element RE1, the second rotational element RE2, and the third rotational element RE3 of the differential section 16 are in a differential state where they are allowed to rotate relative to each other while the rotational speed of the first ring gear R1, which is represented by the point of intersection between the line L0 and the vertical line Y3, is maintained substantially constant by being restricted by the vehicle speed V, the rotational speed of the fist sun gear S1, that is, the rotational speed of the first electric motor M1, which is represented by the point of intersection between the line L0 and the vertical line Y1, increases and decreases as the rotational speed of the first carrier CA1, which is represented by the point of intersection between the line L0 and the vertical line Y2, is increased and reduced by controlling the engine speed $N_E$. When the rotational speed of the first sun gear S1 is made equal to the engine speed $N_E$ by controlling the rotational speed of the first electric motor M1 so as to maintain the transmission gear ratio γ0 of the differential section 16 at 1, the line L0 coincides with the lateral line X2, whereby the rotational speed of the first ring gear R1 equals the engine speed $N_E$, that is, the transmission member 18 rotates at the same speed as the engine speed $N_E$. When the rotational speed of the first sun gear S1 is made zero by controlling the rotational speed of the first electric motor M1 so as to maintain the transmission gear ratio γ0 at a value smaller than 1, for example, approx. 0.7, the transmission member 18 rotates at a speed higher than the engine speed $N_E$.

Further, in the alignment chart of FIG. 3, the fourth rotational element RE4 is selectively coupled with the transmission member 18 via the second clutch C2 and with the case 12 via the first brake B1, and the fifth rotational element RE5 is selectively coupled with the case 12 via the second brake B2. Further, the sixth rotational element RE6 is selectively coupled with the case 12 via the third brake B3, the seventh rotational element RE7 is selectively coupled with the output shaft 22, and the eighth rotational element RE8 is selectively coupled with the transmission member 18 via the first clutch C1. When the line L0 at the differential section 16 is made to coincide with the lateral line X2 so that rotation of a speed equal to the engine speed $N_E$ is input from the differential section 16 to the eighth rotational element RE8, the rotational speed of the output shaft 22 at the first speed (1st) that is established by the first clutch C1 and the third brake B3 being engaged as shown in FIG. 3 is represented by the point of intersection between the vertical line Y7 representing the rotational speed of the seventh rotational element RE7 coupled with the output shaft 22 and the oblique line L1 extending through the point of intersection of the vertical line Y8 representing the rotational speed of the eighth rotational element RE8 and the lateral line X2 and the point of intersection between the vertical line Y6 representing the rotational speed of the sixth rotational element RE6 and the lateral line X1. Likewise, the rotational speed of the output shaft 22 at the second speed (ed) that is established by the first clutch C1 and the second brake B2 being engaged as shown in FIG. 3 is represented by the point of intersection between the oblique line 12 and the vertical line Y7 representing the rotational speed of the seventh rotational element RE7 coupled with the output shaft 22. Likewise, the rotational speed of the output shaft 22 at the third speed (3rd) that is established by the first clutch C1 and the first brake B1 being engaged as shown in FIG. 3 is represented by the point of intersection between the oblique line L3 and the vertical line Y7 representing the rotational speed of the seventh rotational element RE7 coupled with the output shaft 22. Likewise, the rotational speed of the output shaft 22 at the fourth speed (4th) that is established by the first clutch C1 and the second clutch C2 being engaged as shown in FIZZ 3 is represented by the point of intersection between the horizontal line L4 and the vertical line Y7 representing the rotational speed of the seventh rotational element RE7 coupled with the output shaft 22.

Figure 4:
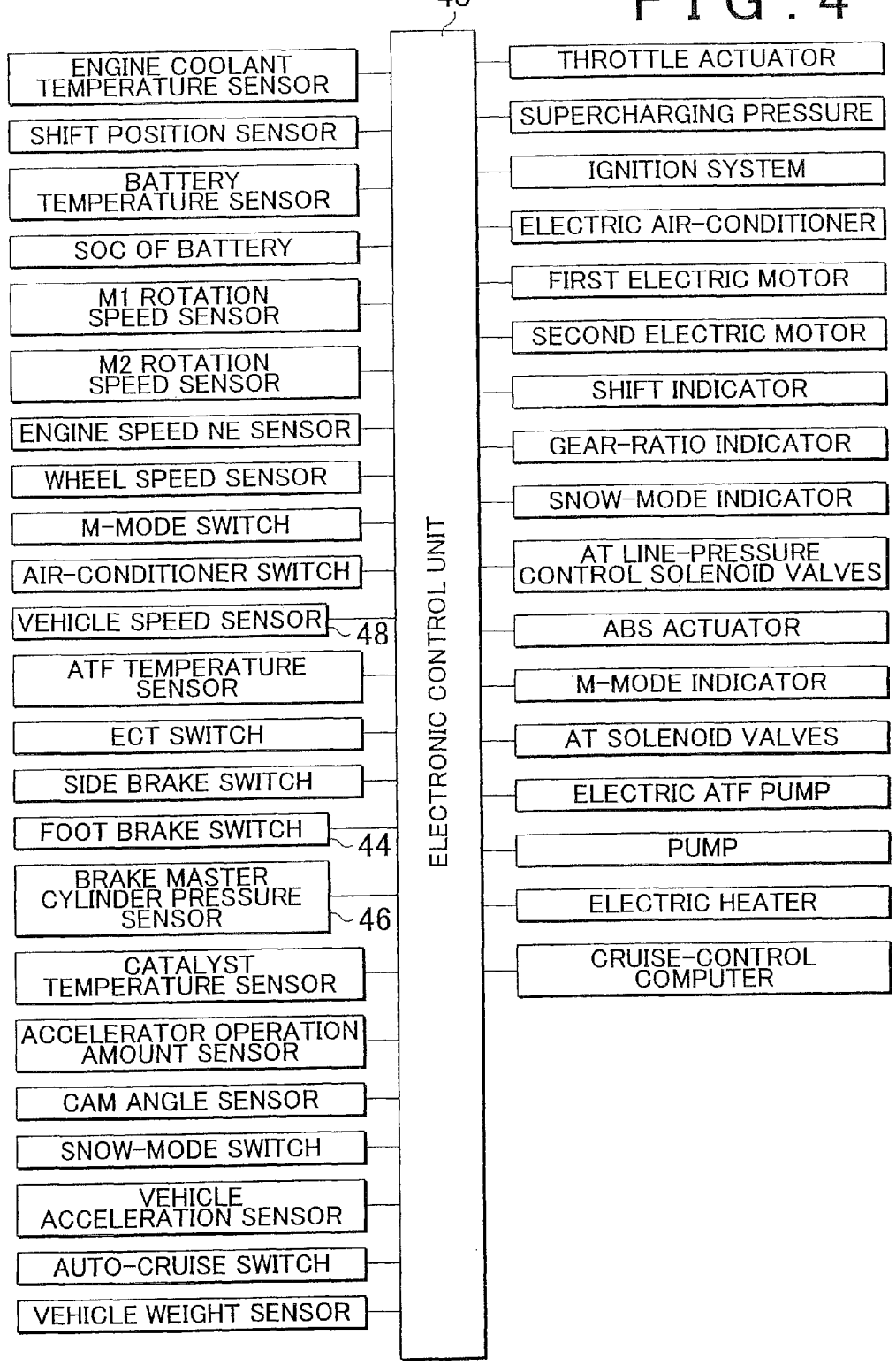
FIG. 4 is a view representing signals input to and output from an electronic control unit provided in the vehicle power transmission system shown in FIG. 1 to control the operation of the vehicle power transmission system.

FIG. 4 shows signals input to and output from an electronic control unit 40 provided in the vehicle power transmission system 10 to control the operation of the vehicle power transmission system 10. The electronic control unit 40 incorporates a microcomputer constituted of a CPU (Central Processing Unit), a ROM (Read Only Memory), a RAM (Random Access Memory), an input interface, an output interface, and so on. The electronic control unit 40 performs various controls (e.g., drive control for the engine 8, hybrid drive control for the engine 8, the first electric motor M1, and the second electric motor M2, shift control for the automatic transmission section 20) by processing various signals on corresponding programs stored in the ROM while utilizing the temporary recording function of the RAM.

Referring to FIG. 4, the electronic control unit 40 receives signals from various sensors, switches, and the like, which are related to the vehicle power transmission system 10. For example, these signals include: signals indicating the temperature of engine coolant; signals indicating the position of a shift lever 52 (shown in FIG. 5) and the number of times the shift lever 52 has been operated at an "M" position, and so on; signals indicating the temperature of a power storage 56 (shown in FIG. 6); signals indicating the SOC (State Of Charge) of the power storage 56; signals indicating a rotational speed $N_{M1}$ of the first electric motor M1; signals indicating a rotational speed $N_{M2}$ of the second electric motor M2; signals indicating the engine speed $N_E$ of the engine 8; signals indicating the rotational speed of each wheel of the vehicle; signals indicating whether an M mode switch (manual shift mode switch) being on or off; signals indicating the operation of the air-conditioner; signals indicating the rotational speed $N_{OUT}$ of the output shaft 22 corresponding to the vehicle speed V; signals indicating the temperature of ATF (Automatic Transmission Fluid) for actuating the automatic transmission section 20; signals indicating the operation of a side brake; signals indicating the operation of a foot brake; signals indicating the pressure of a brake master cylinder for the foot brake; signals indicating the temperatures of catalyst units; signals indicating an accelerator operation amount ACC indicating the operation amount of an accelerator pedal that corresponds to the amount of output required by the driver; signals indicating the cam angles; signals indicating whether a snow mode is set; signals indicating a longitudinal acceleration G of the vehicle; signals indicating auto cruising of the vehicle; and signals indicating the weight of the vehicle.

The electronic control unit 40 outputs various control signals for controlling the vehicle power transmission system 10. The controls signals output from the electronic control unit 40 include, for example: controls signals to an engine output control device 58 (shown in FIG. 6) for controlling the engine output (e.g., drive signals to a throttle actuator 64 used to adjust an opening degree $\theta_{TH}$ of an electronic throttle valve 62 provided in an intake pipe of the engine 8, fuel-supply signals for controlling the amount of fuel to be supplied from fuel injection system 66 to an intake pipe or to the cylinders of the engine 8, ignition signals for controlling the ignition timing of an ignition system 68, and signals for adjusting the supercharging pressure); electric air-conditioner drive signals for driving an electric air-conditioner, command signals for controlling the operations of the first electric motor M1 and the second electric motor M2; shift-position (operation position) indication signals for controlling indications on a shift indicator; gear-ratio indication signals for indicating gear ratios; snow-mode indication signals for indicating that the snow mode is presently selected; ABS-activation signals for activating an ABS actuator used to prevent slipping of the wheels of the vehicle upon braking; M-mode indication signals indicating that the M mode is presently selected; valve-control signals for actuating electromagnetic valves (linear solenoid valves) provided in a hydraulic control circuit 38 (shown in FIG. 6) to control the hydraulic actuators of the respective hydraulic friction engagement elements provided in the differential section 16 and the automatic transmission section 20; signals for controlling regulator valves (pressure-adjustment valves) provided in the hydraulic control circuit 38 to adjust a line hydraulic pressure $P_L$; drive signals for actuating an electric hydraulic pump for producing the base pressure for obtaining the line hydraulic pressure $P_L$; signals for energizing an electric heater, signals to a cruise-control computer; and output-saving signals for notifying the driver when the outputs of the power sources (will be referred to as "power source output" where necessary) are presently saved, for example, when the engine output (engine power) and the output of the second electric motor M2 (will be referred to as "second electric motor output") are saved.

Figure 5:
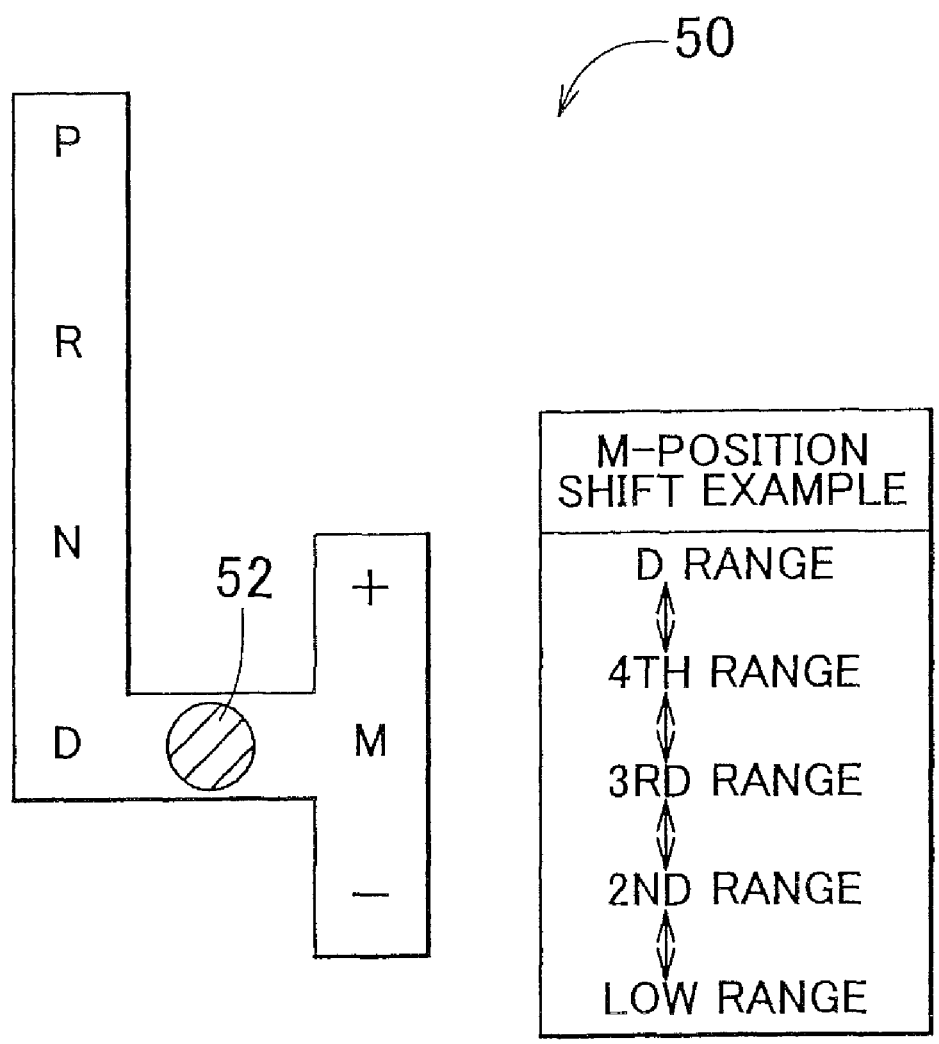
FIG. 5 is a view illustrating an example of a shift-operation device that allows the vehicle power transmission system shown in FIG. 1 to be manually shifted among a plurality of shift positions.

FIG. 5 illustrates an example of a shift-operation device 50 that allows the vehicle power transmission system 10 to be manually shifted among a plurality of shift positions $P_{SH}$. The shift-operation device 50 is, for example, provided beside the driver's seat and has the shift lever 52 used to select a desired one of the shift positions $P_{SH}$. The shift positions for the shift lever 52 include: a parking position ("P" position) where a neutral state is established in which the power transmission path in the vehicle power transmission system 10 is interrupted while the output shaft 22 of the automatic transmission section 20 is locked; a reverse-drive position ("R" position) for reverse drive; a neutral position ("N" position) where the neutral state is established in which the power transmission path in the vehicle power transmission system 10 is interrupted; a forward-drive automatic shift position ("D" position) where an automatic shift mode is established in which automatic shift control is performed within the variation range of the total transmission gear ratio γT that is based on the continuously variable transmission gear ratio obtained at the differential section 16 and the speed established at the automatic transmission section 20 that shifts using the first to fourth speeds; and a forward-drive manual shift position ("M" position) where a manual-shift drive mode (manual mode) is established in which the shift range of the automatic transmission section 20 is manually switched among a plurality of ranges in each of which the highest speed to which the automatic transmission section 20 may be shifted is different.

In the vehicle power transmission system 10 described above, as the shift lever 52 is manually operated to each shift position $P_{SH}$, the active path at the hydraulic control circuit 38 is electrically switched from one to the other so as to establish a desired speed at the reverse-drive range ("R"), the neutral range ("N"), and the forward-drive range ("D"). Among the respective shift positions $P_{SH}$ (the P position to the M position) described above, the P position and the N position are non-drive positions selected when the vehicle is not driven. Therefore, for example, at the P position and the N position, the first clutch C1 and the second clutch C2 are released to interrupt the power transmission path on which the first clutch C1 and the second clutch C2 are provided and thus place the vehicle in a non-drive mode as shown in the engagement table of FIG. 2.

On the other hand, the R position, the D position, and the M position are drive positions at which the vehicle is driven. Thus, for example, at these positions, at least one of the first clutch C1 and the second clutch C2 is engaged to connect the power transmission path in the automatic transmission section 20 and thus place the vehicle in a drive mode as shown in the engagement table of FIG. 2.

In the shift-operation device 50 shown in FIG. 5, more specifically, as the shift lever 52 is manually shifted from the P position or the N position to the R position, the second clutch C2 is engaged, so that the state of the power transmission path in the automatic transmission section 20 is switched from the interrupted state to the connected state. Likewise, as the shift lever 52 is manually shifted from the N position to the D position, at least the first clutch C1 is engaged, so that the state of the power transmission path in the automatic transmission section 20 is switched from the interrupted state to the connected state. Conversely, as the shift lever 52 is manually shifted from the R position to the P position or to the N position, the second clutch C2 is released, so that the state of the power transmission path in the automatic transmission section 20 is switched from the connected state to the interrupted state. Likewise, as the shift lever 52 is manually shifted from the D position to the N position, the first clutch C1 and the second clutch C2 are released, so that the state of the power transmission path in the automatic transmission section 20 is switched from the connected state to the interrupted state.

Figure 6:
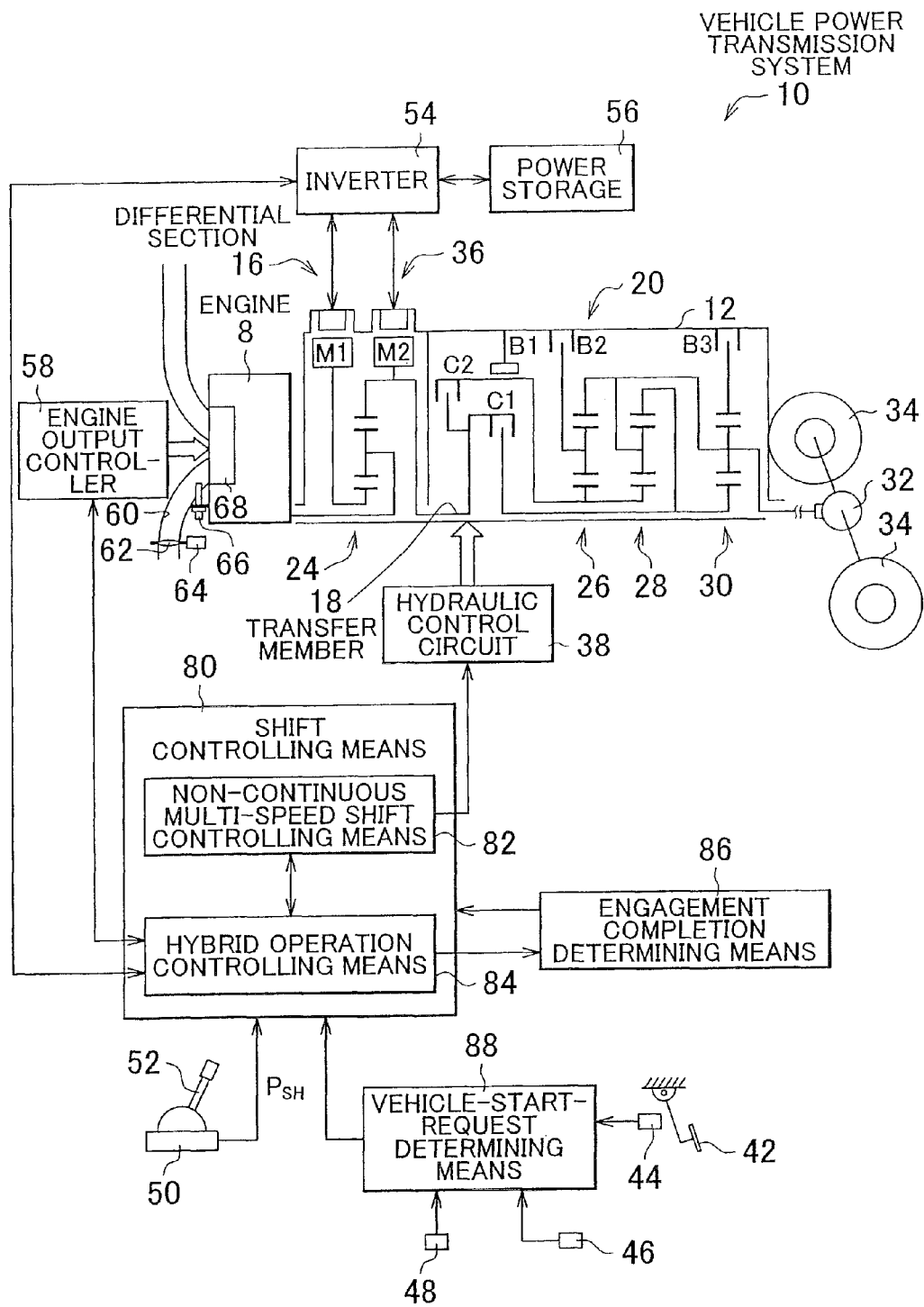
FIG. 6 is a function block diagram illustrating the main control functions of the electronic control unit shown in FIG. 4.

FIG. 6 is a function block diagram illustrating the main control functions of the electronic control unit 40. Referring to FIG. 6, shift controlling means 80 controls the transmission gear ratio of the vehicle power transmission system 10 that is constituted of the differential section 16 serving as an electric CVT and the automatic transmission section 20 serving as a non-continuous multi-speed transmission as described above. Thus, the shift controlling means 80 incorporates non-continuous multi-speed shift controlling means 82 for controlling the automatic transmission section 20 and hybrid operation controlling means 84 for controlling the differential section 16 via the engine 8, the first electric motor M1, and the second electric motor M2.

The non-continuous multi-speed shift controlling means 82 determines whether the automatic transmission section 20 should be shifted, that is, it determines the speed to which the automatic transmission section 20 should be shifted. The non-continuous multi-speed shift controlling means 82 makes such determination by engaging the actual vehicle speed V and the target (required) output torque $T_{OUT}$, which are parameters indicating the state of the vehicle, to a map (shift map) composed of up-shift curves (solid curves) and downshift curves (single-dotted curves) such as the one shown in FIG. 7. After making such determination, in order to shift the automatic transmission section 20 as illustrated in the engagement chart of FIG. 2, the non-continuous multi-speed shift controlling means 82 provides the hydraulic control circuit 38 with commands for engaging and releasing the hydraulic friction engagement elements that are used for the shifting of the automatic transmission section 20 (shift output commands, hydraulic pressure commands). In other words, in order to perform clutch-to-clutch shift, the non-continuous multi-speed shift controlling means 82 provides the hydraulic control circuit 38 with a command for releasing one-side engagement element, which needs to be released to perform the required shift of the automatic transmission section 20, and a command for engaging the other-side engagement element, which needs to be engaged to perform the required shift of the automatic transmission section 20. Then, in response to these commands from the non-continuous multi-speed shift controlling means 82, for example, the hydraulic control circuit 38 operates the linear solenoid valves SL so as to activate the corresponding hydraulic actuators, and thereby the shifting of the automatic transmission section 20 are executed by releasing one-side engagement element and engaging the other-side engagement element.

The hybrid operation controlling means 84 is differential-section controlling means for controlling the operation of the differential section 16. The hybrid operation controlling means 84 controls the transmission gear ratio γ0 of the differential section 16 as an electric CVT by optimizing the drive force allocations to the engine 8 and to the first electric motor M1 and optimizing the reactive force caused by electric generation at the first electric motor M1 while operating the engine 8 in a high efficiency operation region. For example, the hybrid operation controlling means 84 calculates a target (required) output of the vehicle from the accelerator operation amount Acc, which represents the output required by the driver, and the present vehicle speed V. Then, the hybrid operation controlling means 84 calculates a total target output from the calculated target output of the vehicle and the output required for power-charging and then calculates a target engine output required to obtain the total target output based on the transmission loss, the load of auxiliaries, the assist torque of the second electric motor M2, and so on. Then, the hybrid operation controlling means 84 controls the engine speed $N_E$ and the engine torque $T_E$ of the engine 8 to values corresponding to the target engine output while controlling the amount of electric power generated by the first electric motor M1.

As such, the total transmission gear ratio $\gamma T$ of the vehicle power transmission system 10, which is the total transmission gear ratio obtained at the vehicle power transmission system 10 as a whole, depends on the transmission gear ratio $\gamma$ of the automatic transmission section 20 controlled by the non-continuous multi-speed shift controlling means 82 and the transmission gear ratio $\gamma 0$ of the differential section 16 controlled by the hybrid operation controlling means 84. That is, in response to an operation of the shift lever 52 according to the driver, the shift controlling means 80 controls the total transmission gear ratio $\gamma T$ of the vehicle power transmission system 10 via the non-continuous multi-speed shift controlling means 82 and the hybrid operation controlling means 84, within the shift range according to the signals $P_{SH}$ indicating the present shift position that is output from the shift-operation device 50.

For example, the hybrid operation controlling means 84 executes the aforementioned hybrid shift control so as to achieve a sufficient drive performance of the vehicle power transmission system 10, a sufficient fuel economy, and so on. More specifically, in the hybrid shift control, the differential section 16 is used as an electric CVT for matching the value of the engine speed $N_E$ corresponding to an operation region in which the operation efficiency of the engine 8 is high, the vehicle speed V, and the rotational speed of the transmission member 18 that depends on the speed established at the automatic transmission section 20. In other words, in order to actuate the engine 8 in accordance with an optimum fuel-economy curve that has been empirically formulated as a two-dimensional coordinate system defined by the engine speed $N_E$ and the engine torque $T_E$ so as to accomplish both a high vehicle drivability and a high fuel economy during CVT drive, the hybrid operation controlling means 84 sets the target value of the total transmission gear ratio $\gamma T$ of the vehicle power transmission system 10 such that the engine torque $T_E$ and the engine speed $N_E$ are obtained to generate an engine output for achieving a target output. Then, the hybrid operation controlling means 84 controls the transmission gear ratio $\gamma 0$ of the differential section 16 in consideration of the speed of the automatic transmission section 20 so as to obtain the target value of the total transmission gear ratio $\gamma T$ of the vehicle power transmission system 10, and controls the total transmission gear ratio $\gamma T$ within the speed-variable range in a non-stepped manner.

At this time, the hybrid operation controlling means 84 supplies the electric power generated by the first electric motor M1 to the power storage 56 and to the second electric motor M2 via an inverter 54. That is, the majority of the drive force of the engine 8 is mechanically transferred to the transmission member 18 while part of said drive force is converted into electric power by being consumed for electric generation at the first electric motor M1. The electric power generated by the first electric motor M1 is supplied to the second electric motor M2 via the inverter 54 and used to drive the second electric motor M2, and the drive force thus produced by the second electric motor M2 is transferred to the transmission member 18. These components used for such electric generation and its consumption for driving the second electric motor M2 form an electric path in which part of the drive force of the engine 8 is converted into electric power and then it is converted into mechanical energy. In particular, when the transmission control of the automatic transmission section 20 is performed by the non-continuous multi-speed-shift controlling means 82, the transmission gear ratio of the automatic transmission section 20 changes in a stepwise manner, and therefore the total transmission gear ratio $\gamma T$ of the vehicle power transmission system 10 also changes in a stepwise manner at around timing of the transmission.

In the above-described control, because the total transmission gear ratio $\gamma T$ of the vehicle power transmission system 10 changes in a stepwise manner, that is, because the total transmission gear ratio $\gamma T$ of the vehicle power transmission system 10 changes from one value to other value non-continuously rather than changing continuously, the drive torque may be changed more quickly than it is when the total transmission gear ratio $\gamma T$ of the vehicle power transmission system 10 is changed continuously. However, when the total transmission gear ratio $\gamma T$ of the vehicle power transmission system 10 is changed in a stepwise manner, shift shocks may occur and the engine speed $N_E$ may fail to be controlled according to the optimum fuel economy curve mentioned above, resulting in deterioration of the fuel economy. To cope with this issue, the hybrid operation controlling means 84 prevents such stepped changes in the total transmission gear ratio $\gamma T$ of the vehicle power transmission system 10 by changing, in synchronization with the shifting of the automatic transmission section 20, the transmission gear ratio of the differential section 16 in a direction opposite to the direction in which the transmission gear ratio of the automatic transmission section 20 is changed. That is, the hybrid operation controlling means 84 shifts the differential section 16 in synchronization with the shifting of the automatic transmission section 20 such that the total transmission gear ratio $\gamma T$ of the vehicle power transmission system 10 continuously changes when the automatic transmission section 20 shifts from one speed to other speed. More specifically, for example, the hybrid operation controlling means 84 shifts, in synchronization with the shifting of the automatic transmission section 20, the differential section 16 such that the transmission gear ratio of the differential section 16 changes in a stepwise manner in a direction opposite to the direction in which the transmission gear ratio of the automatic transmission section 20 is changed in a stepwise manner, thereby preventing transitional changes in the total transmission gear ratio $\gamma T$ of the vehicle power transmission system 10 during the shifting of the automatic transmission section 20. In this case, the amount the transmission gear ratio of the differential section 16 is changed in a stepwise manner corresponds to the amount the transmission gear ratio of the automatic transmission section 20 is changed in a stepwise manner.

Further, regardless of whether the vehicle is running or not, the hybrid operation controlling means 84 controls the speed of the engine 8 via the first electric motor M1 using the electric CVT function of the differential section 16. For example, the hybrid operation controlling means 84 maintains the engine speed $N_E$ substantially constant or controls it to a desired speed by controlling the rotational speed $N_{M1}$ of the first electric motor M1. More specifically, for example, referring to the alignment chart of FIG. 3, the engine speed $N_E$ may be increased by increasing the rotational speed $N_{M1}$ of the first electric motor M1 while maintaining the rotational speed $N_{M2}$ of the second electric motor M2, which corresponds to the vehicle speed V (i.e., the rotational speed of the drive wheels 34), substantially constant. That is, such control of the engine speed $N_E$ of the engine 8 (the primary power source) via the first electric motor M1 is performed during control for starting up the engine 8, during control for stopping the engine 8, and during electric generation of the first electric motor M1.

Further, the hybrid operation controlling means 84 performs engine output control to output a requited drive force from the engine 8. In the engine output control, the hybrid operation controlling means 84 provides the engine output control device 58 with, independently or in combinations, commands for controlling the throttle actuator 64 to open and close the electronic throttle valve 62 (throttle control), commands for controlling the fuel injection system 66 for control of the fuel injection amount and the fuel injection timing (fuel injection control), commands for controlling the ignition system 68 (e.g., igniters) for control of ignition timing (ignition timing control). During the throttle control, for example, the throttle actuator 64 is driven based on the accelerator operation amount Acc from a predetermined relation, which is not shown in the drawings, such that the throttle opening degree $\theta_{TH}$ is controlled to increase as the accelerator operation amount Acc increases. Further, the engine output control device 58 controls the engine torque in accordance with the commands from the hybrid operation controlling means 84 through various controls including the throttle control that controls the opening and closing of the electronic throttle valve 62 via the throttle actuator 64, the fuel injection control that controls the fuel injection from the fuel injection system 66, and the ignition control that controls the ignition timing of the ignition system 68 (e.g., igniters).

Figure 7:
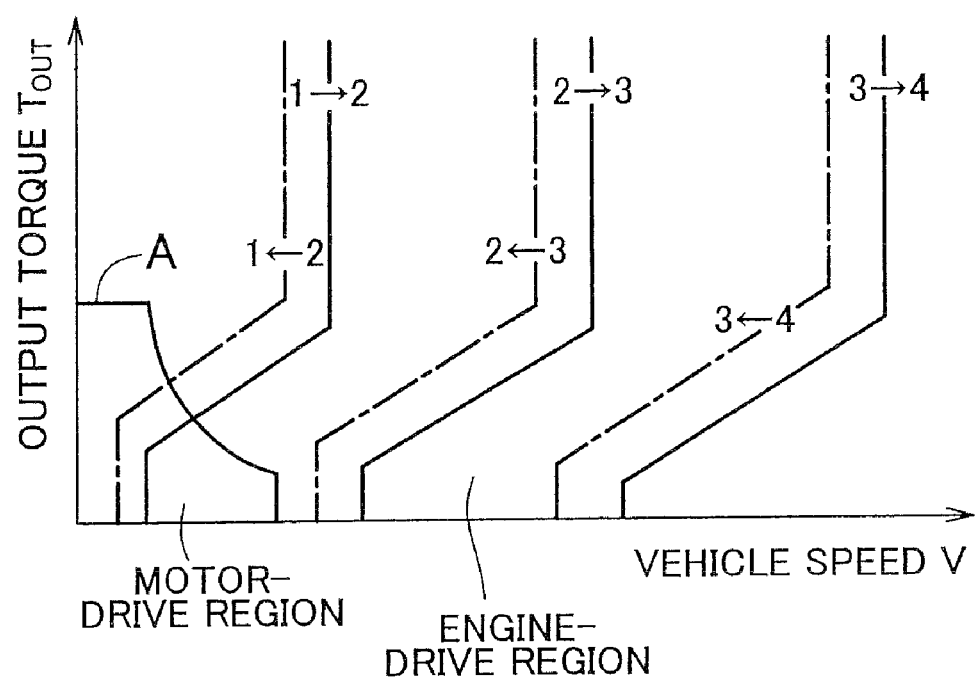
FIG. 7 is a map composed of up-shift curves and downshift curves defined by the vehicle speed and the target output torque of the automatic transmission section as parameters and used to control the speed of the automatic transmission section and to switch the drive mode of the vehicle between an engine drive mode and a motor drive mode.

Further, regardless of whether the engine 8 is in a stopped state or in an idling state, the hybrid operation controlling means 84 propels the vehicle using the motor while utilizing the electric CVT function (differential function) of the differential section 16. For this operation, for example, a map (power source switching map, power source map) may be used which defines, using the vehicle speed V and the required output torque $T_{OUT}$ of the automatic transmission section 20 as parameters, a boundary between an engine-drive region in which the engine 8 is used as the power source for moving the vehicle and a motor-drive region in which the second electric motor M2 is used as the power source for moving the vehicle, such as the one indicated by the solid line A in FIG. 7. In this case, whether the vehicle is presently in the engine-drive region or the motor-drive region is determined by engaging the present vehicle speed V and the required output torque $T_{OUT}$ of the automatic transmission section 20, both indicating the state of the vehicle, to the above-described map, and the vehicle is placed in the engine-drive mode or in the motor-drive mode in accordance with the result of said determination. The power source map in FIG. 7 is, for example, stored in memory in advance together with the shift maps indicated by the solid curves and the single-dotted curves in FIG. 7. As shown in the FIG. 7, the hybrid operation controlling means 84 places the vehicle in the motor drive mode in the operation region where the output torque $T_{OUT}$ is relatively low, that is, the engine torque $T_E$ is relatively low, or the operation region where the vehicle speed V is relatively low, that is, the vehicle load is relatively low. Note that the engine efficiency is normally lower in low engine torque regions than in high engine torque regions.

In the motor drive mode, for the purpose of suppressing deterioration of the fuel economy that may be caused when the stopped engine 8 is driven unnecessarily, the hybrid operation controlling means 84 places the first electric motor M1 in a no-load state by, for example, making the rotational speed $N_{M1}$ of the first electric motor M1 negative, so that the first electric motor M1 runs idle, whereby the engine speed $N_E$ is fixed at zero or substantially zero due to the electric CVT function (differential function) of the differential section 16. Further, even in the engine-drive region, so-called torque assist for assisting the engine 8 may be performed by supplying electric power from the first electric motor M1 to the second electric motor M2 or from the power storage 56 to the second electric motor M2 through the electric power path described above so that the second electric motor M2 runs and thus supplies torque to the drive wheels 34. Further, by placing the first electric motor M1 in a no-load state and making it run idle, the differential section 16 may be placed in a state where the differential section 16 is unable to transmission torque, that is, a state where the power transmission path in the differential section 16 is interrupted and thus no drive force is output from the differential section 16. That is, the hybrid operation controlling means 84 establishes a neutral state where the power transmission path in the differential section 16 is electrically interrupted by placing the first electric motor M1 in a no-load state.

Thus, the power source map shown in FIG. 7 is formulated such that the motor-drive mode is executed in operation regions where the required output torque $T_{OUT}$ is relatively low and/or the vehicle speed V is relatively low (i.e., the vehicle load is relatively low). Further, although not shown in FIG. 7, because the vehicle speed is relatively low at the R position, that is, upon reverse drive of the vehicle, the vehicle is driven by the second electric motor M2 without using the engine 8. Thus, when the shift lever 52 is shifted from the N position to the D position or to the R position while the vehicle is running at a low speed or while the vehicle is stopped (garage shift: N to D, N to R, or P to R), the hybrid operation controlling means 84 performs control for driving the vehicle using the drive force of the motor, not the drive force of the engine.

Back to FIG. 6, engagement completion determining means 86 determines whether the engagements of the first clutch C1 and/or the second clutch C2, which are the power interruption elements for switching the state of the vehicle power transmission system 10 from a non-drive mode to a drive mode, have been completed, that is, whether the first clutch C1 and/or the second clutch C2 have been completely engaged. The phrase "completely engaged" refers to a state where the rotational torque of the transmission member 18 is fully transferred to the automatic transmission section 20. Preferably, the engagement completion determining means 86 determines the complete engagement of the first clutch C1 and/or the second clutch C2 based on the time elapsed from when engagement commands for engaging the first clutch C1 and/or the second clutch C2 have started to be output from the hybrid operation controlling means 84. More specifically, the engagements of the first clutch C1 and/or the second clutch C2 are determined to have been completed when the actual time from the start of output of the engagement commands from the hybrid operation controlling means 84 reaches a time $T_{COMP}$ that is determined in advance and stored in memory as a reference time from the start of output of the engagement commands to the completion of the engagements of the first clutch C1 and/or the second clutch C2.

Vehicle-start-request determining means 88 determines whether the driver is requesting, through his or her manual operation, to start the vehicle. For example, the vehicle-start-request determining means 88 may be adapted to determine that the driver is making a vehicle-start request when a brake switch 44 is outputting a brake-off signal that is output as the foot brake 42 is released by the driver. Further, the start-request determining means 88 may be adapted to determine that the driver is making a vehicle-start request when the pressure of the brake master cylinder that corresponds to the travel of the foot brake 42 depressed by the driver and detected by a brake master cylinder pressure sensor 46 becomes equal to or lower than a predetermined value. Further, the start-request determining means 88 may be adapted to determine that the driver is making a vehicle-start request when the vehicle speed V corresponding to the rotational speed of the drive wheels 34 and detected by a vehicle speed sensor 48 becomes equal to or higher than a predetermined value. That is, preferably, the vehicle-start-request determining means 88 determines that the driver is requesting to start the vehicle when at least one of the above-described three conditions, that is, the state of the brake switch 44, the pressure of the brake master cylinder, and the vehicle speed V, is satisfied. Further, the vehicle-start-request determining means 88 may determine a vehicle-start request of the driver when two of the three conditions are satisfied at the same time, for example. Further, the vehicle-start-request determining means 88 may determine a vehicle-start request of the driver based on the accelerator operation amount Acc corresponding to the travel of the accelerator pedal, not shown in the drawings.

When the state of the vehicle power transmission system 10 (the automatic transmission section 20) is being switched from a non-drive mode to a drive mode by engaging the first clutch C1 and/or the second clutch C2 (i.e.; the period from the start to the end of their engagements), the hybrid operation controlling means 84 executes rotational speed maintaining control in which the output rotational speed of the differential section 16 is maintained at a predetermined constant value until the engagement completion determining means 86 determines that the engagements of the first clutch C1 and/or the second clutch C2, which are power interruption elements, are completed. In other words, until the engagement completion determining means 86 determines that the engagements of the first clutch C1 and/or the second clutch C2 are completed, the hybrid operation controlling means 84 enables the engine speed $N_E$ to be controlled via the first electric motor M1 by continuing the above-described rotational speed maintaining control, that is, by maintaining the output rotational speed of the differential section 16 at a predetermined constant value or within a predetermined range. For example, the rotational speed maintaining control is executed when the engine 8 is started up and the vehicle starts moving in response to, for example, the shift lever 52 of the shift-operation device 50 being shifted from the N position or the P position to the D position or the R position. As mentioned earlier, the output rotational speed of the differential section 16 is the rotational speed of the transmission member 18 that is the output rotational element of the differential section 16, and the transmission member 18 is connected to the second electric motor M2. With this arrangement, during the rotational speed maintaining control, the hybrid operation controlling means 84 maintains the rotational speed of the transmission member 18, which is the output rotational element of the differential section 16, at the predetermined constant value or within the predetermined range by maintaining the rotational speed $N_{M2}$ of the second electric motor M2 at the predetermined constant value or within the predetermined range. Preferably, the rotational speed maintaining control is performed so as to maintain the output rotational speed of the transmission member 18 (the rotational speed of the transmission member 18 relative to the case 12) at the predetermined constant value, more preferably, fixed at zero. In this case, it may be said that when the state of the vehicle power transmission system 10 (the automatic transmission section 26) is being switched from a non-drive mode to a drive mode, the hybrid operation controlling means 84 executes rotation-stopping control to fix the output rotational speed of the differential section 16 at zero until the engagement completion determining means 86 determines that the engagements of the first clutch C1 and/or the second clutch C2 have been completed.

Further, preferably, the hybrid operation controlling means 84 changes the time to discontinue the rotational speed maintaining control based on whether the driver is making a vehicle-start request or based on the drive state of the engine 8 that is the primary power source of the vehicle. That is, preferably, during the rotational speed maintaining control, when the vehicle-start-request determining means 88 detects a vehicle-start request of the driver, the rotational speed maintaining control is immediately discontinued to allow the output rotational speed of the differential section 16, that is, the rotational speed of the transmission member 18 to change (increase when the vehicle starts moving). Further, preferably, during the rotational speed maintaining control, when the accelerator operation amount Acc increases as the driver further depresses the accelerator pedal, not shown in the drawings, and the engine speed $N_E$ of the engine 8 becomes equal to or larger than a predetermined constant value, the rotational speed maintaining control is discontinued to allow the output rotational speed of the engine 8 to change. In this case, whether to discontinue the rotational speed maintaining control may be determined based on the accelerator operation amount Acc. That is, the rotational speed maintaining control may be discontinued when the accelerator operation amount Acc becomes equal to or larger than a predetermined constant value.

Further, preferably, when the state of the vehicle power transmission system 10 is being switched from a non-drive mode to a drive mode by engaging the first clutch C1 and/or the second clutch C2, the hybrid operation controlling means 84 controls the engine speed $N_E$ of the engine 8, which is the primary power source of the vehicle, such that the engine speed $N_E$ is maintained at a predetermined constant value or within a predetermined range (maintained at a predetermined value or smaller) or such that a change rate $dN_E/dt$ of the engine speed $N_E$ is maintained at a predetermined constant value or within a predetermined range (maintained at a predetermined value or smaller). For example, the predetermined constant value or the predetermined range for the engine speed $N_E$ or its change rate $dN_E/dt$ is empirically determined in advance such that any noise is not caused when the engine 8 is driven while the rotational speed of the second electric motor M2 is maintained constant, and it is stored in memory. The engine speed $N_E$ may be controlled as described above by controlling the opening degree of the electronic throttle valve 62 via the engine output control device 58, controlling the fuel injection via the fuel injection system 66, and controlling the ignition timing via the ignition system 68.

Figure 8:
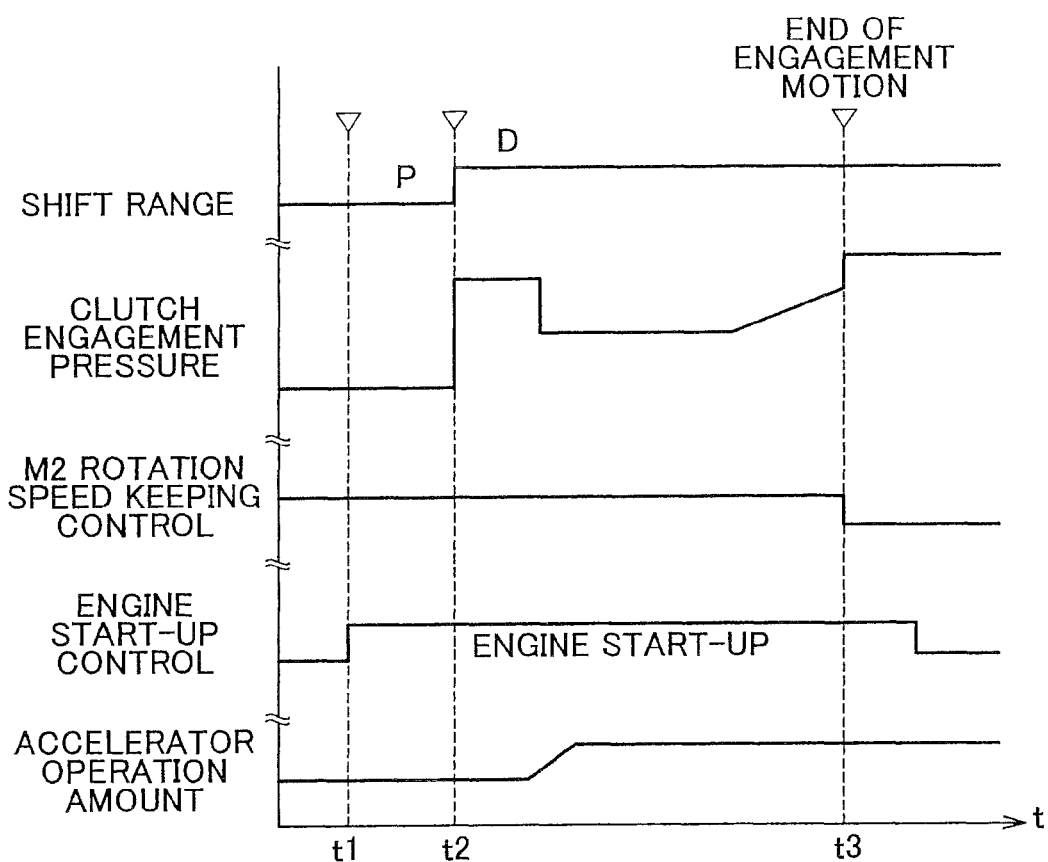
FIG. 8 is a time chart illustrating the rotational speed maintaining control for a second electric motor that the electronic control unit shown in FIG. 4 executes at the time of changing the shift range.
Figure 9:
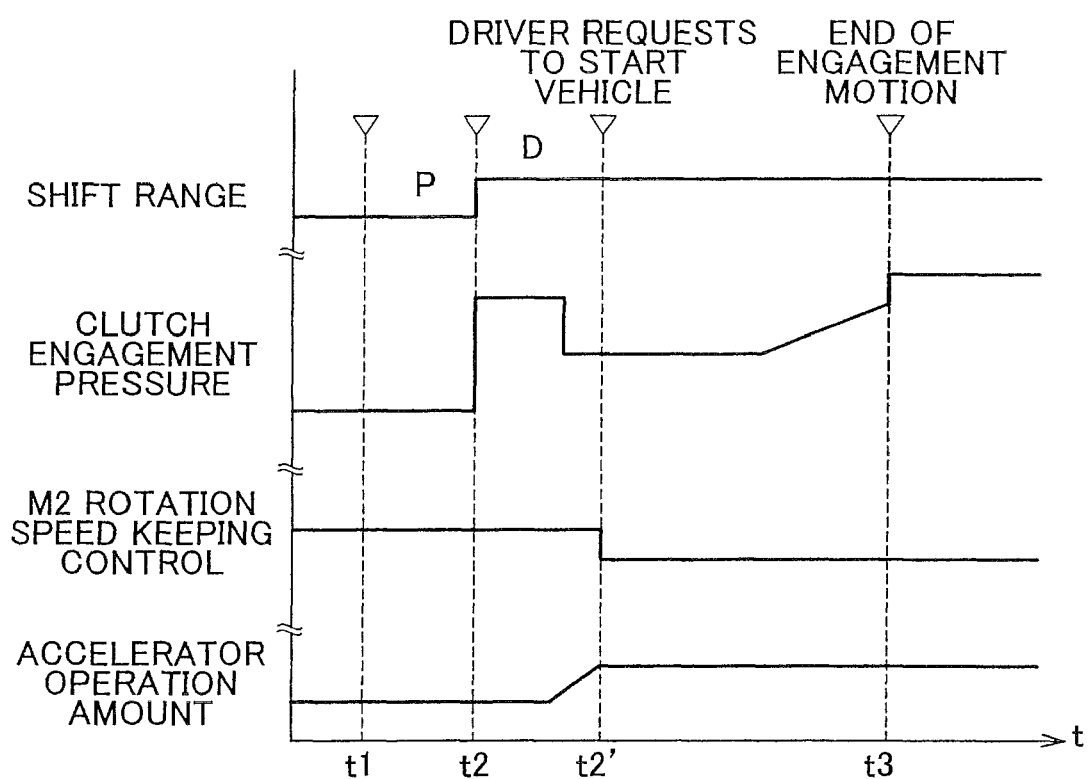
FIG. 9 is a time chart illustrating the rotational speed maintaining control for the second electric motor that the electronic control unit shown in FIG. 4 executes at the time of changing the shift range and is discontinued when a vehicle-start request of the driver is detected.

FIG. 8 and FIG. 9 are time charts illustrating the rotational speed maintaining control for the second electric motor M2 that the hybrid operation controlling means 84 executes at the time of changing the shift range. Referring to FIG. 8, the start-up control for the engine 8 starts at time t1. Then, the shift lever 52 of the shift-operation device 50 is shifted from the N position or the P position to the D position or the R position at time t2, whereby engagement pressure commands for the first clutch C1 and/or the second clutch C2, which are "first-fill" commands, are output and then the engagements of the first clutch C1 and/or the second clutch C2 start. At time t2, the rotational speed maintaining control is being executed to fix the output rotational speed of the second electric motor M2 at zero, and this rotational speed maintaining control is continued until the engagements of the first clutch C1 and/or the second clutch C2 are completed. That is, at time t3, the engagement pressures of the first clutch C1 and/or the second clutch C2 reach "full-engagement" values at time t3 and the engagements of the first clutch C1 and/or the second clutch C2 are determined to have been completed. At this time, the rotational speed maintaining control for the second electric motor M2 is discontinued, allowing the rotational speed of the second electric motor M2 to change (increase). Meanwhile, in the example illustrated in FIG. 9, the rotational speed maintaining control for the second electric motor M2 is discontinued to allow its rotational speed to change when a vehicle-start request of the driver is detected at time t2'. A vehicle-start request of the driver may be detected based on, for example, the state of the brake switch 44, the pressure of the brake master cylinder, and the vehicle speed. According to the control described above, because the output rotational speed of the differential section 16 is fixed until the vehicle power transmission system 10 is placed in a desired drive state, engagement shocks and abnormal engine noises may be effectively suppressed. Further, because the rotational speed maintaining control for the second electric motor M2 is immediately discontinued when a vehicle-start request of the drive is detected, a high drivability of the vehicle may be achieved without deteriorating the drive performance of the vehicle.

Figure 10:
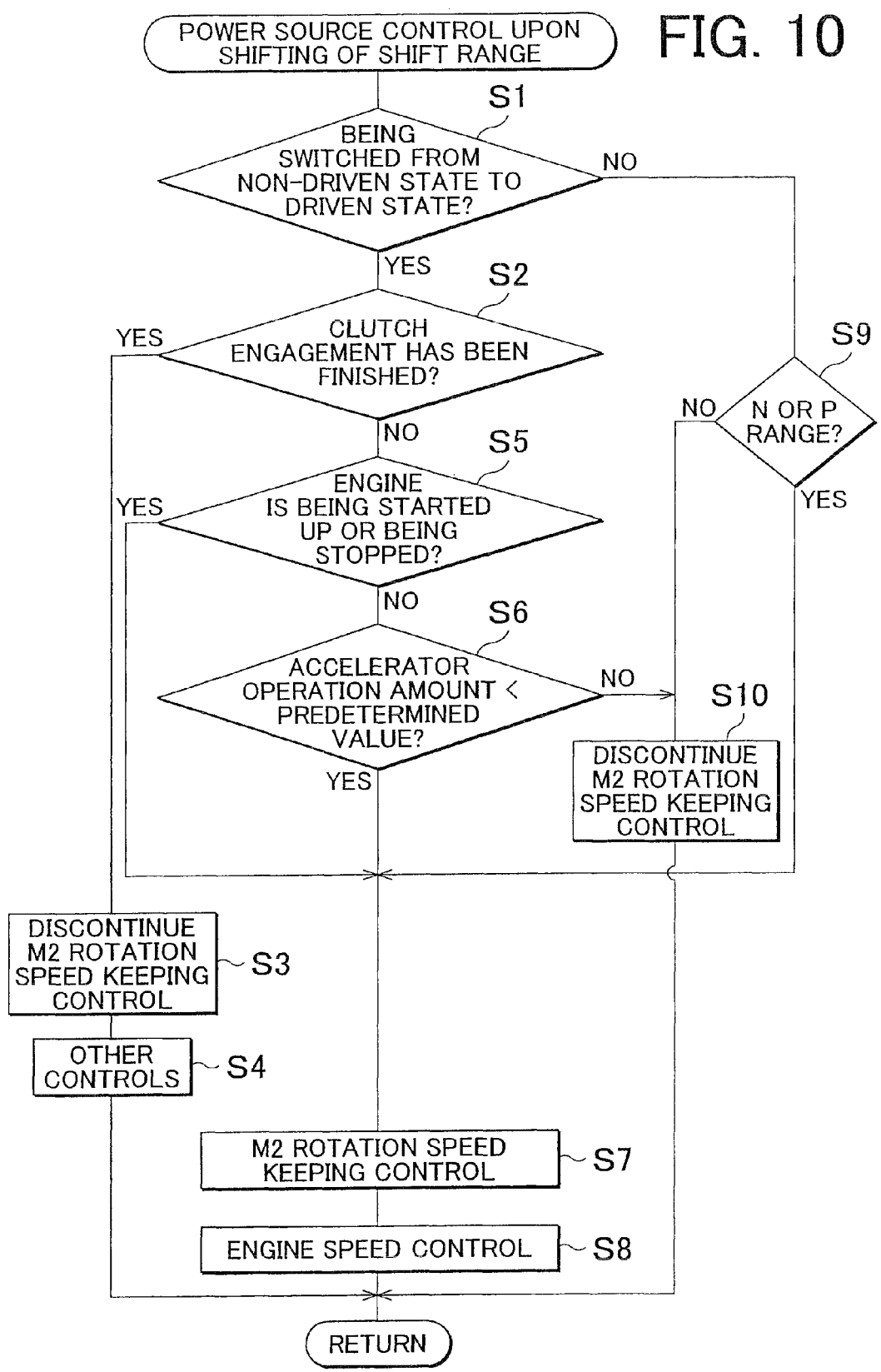
FIG. 10 is a flowchart illustrating a main drive-force control routine that the electronic control unit shown in FIG. 4 executes at the time of changing of the shift range.

FIG. 10 is a flowchart illustrating a main drive-force control routine that the electronic control unit 40 executes at the time of changing of the shift range. This routine is repeatedly executed at given time intervals.

First, in step S1 (hereinafter "step" will be omitted), it is determined whether the shift lever 52 of the shift-operation device 50 is shifted from the N position or the P position to the D position or the R position, which the state of the vehicle power transmission system 10 is now being switched from a non-drive mode to a drive mode. If "NO" in S1, the processes in S9 and its subsequent steps are executed. On the other hand, if "YES" in S1, it is then determined in S2, which is executed by the engagement completion determining means 86, whether the engagements of the first clutch C1 and/or the second clutch C2, which are power interruption elements, have been completed (e.g., whether a predetermined time has passed from the start of the engagements of the first clutch C1 and/or the second clutch C2). If "YES" in S2, the rotational speed maintaining control (rotation-stopping control) for the second electric motor M2 is discontinued in S3, allowing the output rotational speed of the second electric motor M2 to change. Then, in S4, other controls are executed, after which the present cycle of the routine is finished. On the other hand, if "NO" in S2, it is then determined in S5 whether either the control for starting up the engine 8 or the control for stopping the engine 8 is presently executed. If "YES" in S5, the processes in S7 and its subsequent steps are execute. If "NO" in S5, it is then determined in S6, which is executed by the vehicle-start-request determining means 88, whether the accelerator operation amount Acc representing the travel of the accelerator pedal (not shown in the drawings) depressed by the driver is equal to or smaller than a predetermined value. If "NO" in S6, the processes in S10 and its subsequent steps are executed. On the other hand, if "YES" in S6, the rotational speed maintaining control for the second electric motor M2 is started or continued in S7. Then, in S8, the engine speed $N_E$ of the engine 8 is controlled such that the engine speed $N_E$ is maintained at a predetermined constant value or within a predetermined range or such that the change rate $dN_E/dt$ of the engine speed $N_E$ is maintained at a predetermined constant value or within a predetermined range. Then, the present cycle of the routine is finished. On the other hand, in S9, it is determined whether the shift lever 52 of the shift-operation device 50 is presently either at the N position or at the P position. If "YES" in S9, the processes in S7 and its subsequent steps are executed. On the other hand, if "NO" in S9, the rotational speed maintaining control for the second electric motor M2 is discontinued in S1, allowing the output rotational speed of the second electric motor M2 to change. Then, the present cycle of the routine is finished. In the routine describe above, the processes of S3, S4, S7, S8, and S10 are executed by the hybrid operation controlling means 84.

As such, in the foregoing example embodiment of the invention, the vehicle power transmission system 10 incorporates the first electric motor M1, the differential section 16 having the first sun gear S1 (the second rotational element RE2) connected to the first electric motor M1 and operable to control its differential motion between the rotation input to the differential section and the rotation output from the differential section 16 by controlling the operation state of the first electric motor M1, the clutches C1, C2 that are power interruption elements provided on the power transmission path, and the second electric motor M2 connected to the power transmission path between the clutches C1, C2 and the transmission member 18 that is the output rotational element of the differential section 16, and when the state of the vehicle power transmission system 10 is being switched from a non-drive mode to a drive mode by engaging the first clutch C1 and/or the second clutch C2, the rotational speed maintaining control is executed in which the output rotational speed of the differential section 16 is maintained at the predetermined constant value until the engagements of the first clutch C1 and/or the second clutch C2 are completed, that is, the output rotational speed of the differential section 16 does not change until the vehicle power transmission system 10 is placed in the drive state. According to the vehicle power transmission system 10, as such, engagement shocks and abnormal engine noises, which may otherwise be caused when the state of the vehicle power transmission system 10 is being switched from a non-drive mode to a drive mode, may be effectively suppressed, that is, a high drivability of the vehicle may be maintained even when the state of the vehicle power transmission system 10 is being switched from a non-drive mode to a drive mode.

According to the vehicle power transmission system 10 of the foregoing example embodiment of the invention, further, the time to discontinue the rotational speed maintaining control for the second electric motor M2 is changed based on whether the driver is making a vehicle-start request or based on the drive state of the engine 8, which is the primary power source of the vehicle. As such, when the driver has made a vehicle-start request or when the drive state of the engine 8 needs to be controlled, priority is given to such a request or necessity. Therefore, a high drivability of the vehicle may be achieved without deteriorating the drive performance of the vehicle when the state of the vehicle power transmission system 10 is being switched from a non-drive mode to a drive mode.

According to the vehicle power transmission system 10 of the foregoing example embodiment of the invention, further, the second electric motor M2 is drivingly connected to the transmission member 18 that is the output rotational element of the differential section 16 and the rotational speed maintaining control is executed to maintain the rotational speed of the transmission member 18 at the predetermined constant value using the second electric motor M2, the rotational speed maintaining control may be easily performed using the second electric motor M2.

According to the vehicle power transmission system 10 of the foregoing example embodiment of the invention, further, the engine speed $N_E$ of the engine 8 is maintained at a predetermined constant value or within a predetermined range when the state of the vehicle power transmission system 10 is being switched from a non-drive mode to a drive mode by engaging the first clutch C1 and/or the second clutch C2. Therefore, the output rotational speed of the differential section 16 may be easily maintained constant until the engagements of the first clutch C1 and/or the second clutch C2 are completed, and thereby engagement shocks, abnormal engine noises, and the like may be effectively suppressed.

According to the vehicle power transmission system 10 of the foregoing example embodiment of the invention, further, the change rate $dN_E/dt$ of the engine speed $N_E$ of the engine 8 is maintained at a predetermined constant value or within a predetermined range when the state of the vehicle power transmission system 10 is being switched from a non-drive mode to a drive mode by engaging the first clutch C1 and/or the second clutch C1. Therefore, the output rotational speed of the differential section 16 may be easily maintained constant until the engagements of the first clutch C1 and/or the second clutch C2 are completed, and thereby engagement shocks, abnormal engine noises, and the like, may be effectively suppressed.

According to the vehicle power transmission system 10 of the foregoing example embodiment of the invention, further, because the engine speed $N_E$ is controlled via the first electric motor M1 during the control for starting up the engine 8, engagement shocks, abnormal engine noises, and the like, may be effectively suppressed during said start-up control.

According to the vehicle power transmission system 10 of the foregoing example embodiment of the invention, further, because the engine speed $N_E$ is controlled via the first electric motor M1 during the control for stopping the engine 8, engagement shocks, abnormal engine noises, and the like, may be effectively suppressed during said stop control.

According to the vehicle power transmission system 10 of the foregoing example embodiment of the invention, further, because the engine speed $N_E$ is controlled via the first electric motor M1 during electric generation of the first electric motor M1, engagement shocks, abnormal engine noises, and the like, may be effectively suppressed during electric generation of the first electric motor M1.

While the invention has been described with reference to example embodiments thereof, it is to be understood that the invention is not limited to the described embodiments or constructions. To the contrary, the invention is intended to cover various modifications and equivalent arrangements. In addition, while the various elements of the example embodiments are shown in various combinations and configurations, other combinations and configurations, including more, less or only a single element, are also within the scope of the claimed invention.

For example, while the invention has been embodied as the vehicle power transmission system 10 having the differential section 16, the automatic transmission section 20, and the first clutch C1 and/or the second clutch C2 provided as power interruption elements on the power transmission path between the differential section 16 and the automatic transmission section 20 in the foregoing example embodiment, the invention may be embodied otherwise For example, the invention may be embodied as a power transmission system having only an electric CVT mechanism, which does not have an automatic transmission section such as the automatic transmission section 20.

Further, according to the foregoing example embodiment, while the rotational speed of the transmission member 18 that is connected to the second electric motor M2 is fixed by maintaining the rotational speed of the second electric motor M2 constant in the vehicle power transmission system 10, the rotational speed of the transmission member 18 may be maintained constant by, for example, controlling the output of the engine 8 and the output of the first electric motor M1.

Further, while the engagements motions of the first clutch C1 and/or the second clutch C2 are determined to have been completed when the time from the start of output of the engagement commands from the hybrid operation controlling means 84 reaches the time $T_{COMP}$ in the vehicle power transmission system 10 of the foregoing example embodiment, this determination may be made otherwise. For example, a hydraulic pressure sensor for detecting the hydraulic pressures supplied to the first clutch C1 and/or to the second clutch C2 may be provided in the hydraulic control circuit 38. In this case, whether the engagements of the first clutch C1 and/or the second clutch C2 have been completed may be determined based on the hydraulic pressures detected by the hydraulic pressure sensor. Further, a sensor for detecting the engagement pressures of the first clutch C1 and/or the second clutch C may be provided. In this case, whether the engagements of the first clutch C1 and/or the second clutch C2 have been completed may be determined based on the engagement pressures detected by the sensor.

What is claimed is:

1. A vehicle power transmission system, comprising:
a first electric motor;
a differential section having an output rotational element, the differential section being connected to the first electric motor and controlling a differential motion between an input rotational speed and an output rotational speed by controlling an operation state of the first electric motor;
a power interruption element that forms a part of a power transmission path;
a second electric motor that is connected to the power transmission path between the power interruption element and the output rotational element of the differential section; and
a control device that maintains the output rotational speed of the differential section at a predetermined constant value or at a value within a predetermined range until engagement of the power interruption element is completed during a period when a state of the vehicle power transmission system is being switched from a non-drive mode to a drive mode, so as to control a rotational speed of a primary power source by the first electric motor, the power interruption element being disengaged when in the non-drive mode, the power interruption element being engaged when in the drive mode.

2. The vehicle power transmission system according to claim 1, wherein the control device stops maintaining the output rotational speed of the differential section at the predetermined constant value or at the value within the predetermined range before the engagement of the power interruption element is completed when, during performance of an engaging operation of the power interruption element, a request for starting a vehicle is received or a drive state of the primary power source is a predetermined state.

3. The vehicle power transmission system according to claim 1, wherein:
the second electric motor is drivingly connected to the output rotational element of the differential section, and the control device maintains a rotational speed of the output rotational element at the predetermined constant value or within the predetermined range by controlling a rotational speed of the second electric motor.

4. The vehicle power transmission system according to claim 1, wherein the control device maintains a rotational speed of the output rotational element at the predetermined constant value or within the predetermined range by controlling outputs of the primary power source and the first electric motor.

5. The vehicle power transmission system according to claim 1, wherein the control device maintains the rotational speed of the primary power source at a predetermined constant value or within a predetermined range when the state of the vehicle power transmission system is being switched from the non-drive mode to the drive mode.

6. The vehicle power transmission system according to claim 1, wherein the control device maintains a change rate of the rotational speed of the primary power source at a predetermined constant value or within a predetermined range when the state of the vehicle power transmission system is being switched from the non-drive mode to the drive mode.

7. The vehicle power transmission system according to claim 1, wherein the rotational speed of the primary power source is controlled by the first electric motor during a start-up control for the primary power source.

8. The vehicle power transmission system according to claim 1, wherein the rotational speed of the primary power source is controlled by the first electric motor during a stop control for the primary power source.

9. The vehicle power transmission system according to claim 1, wherein the rotational speed of the primary power source is controlled by the first electric motor during electric generation by the first electric motor.

10. The vehicle power transmission system according to claim 1, wherein the control device maintains the output rotational speed of the differential section at zero until the engagement of the power interruption element is completed during the period when the state of the vehicle power transmission system is being switched from the non-drive mode to the drive mode.

11. The vehicle power transmission system according to claim 3, wherein the control device maintains the rotational speed of the second electric motor at zero until the engagement of the power interruption element is completed during the period when the state of the vehicle power transmission system is being switched from the non-drive mode to the drive mode.

12. A vehicle power transmission system comprising:
a first electric motor;
a differential section having an output rotational element, the differential section being connected to the first electric motor and controlling a differential motion between an input rotational speed and an output rotational speed by controlling an operation state of the first electric motor;
a power interruption element that forms a part of a power transmission path;
a second electric motor that is connected to the power transmission path between the power interruption element and the output rotational element of the differential section; and
a control device that maintains the output rotational speed of the differential section at a predetermined constant value or at a value within a predetermined range until engagement of the power interruption element is completed during a period when a state of the vehicle power transmission system is being switched from either park or neutral to a drive mode that is neither park nor neutral, so as to control a rotational speed of a primary power source by the first electric motor.

13. The vehicle power transmission system according to claim 12, wherein the control device maintains the output rotational speed of the differential section at zero until the engagement of the power interruption element is completed during the period when the state of the vehicle power transmission system is being switched from park or neutral to the drive mode.

* * * * *